US009010462B2

(12) United States Patent  King

(10) Patent No.: US 9,010,462 B2
(45) Date of Patent: Apr. 21, 2015

(54) LOW HEADROOM CONFINED SPACE GEOEXCHANGE DRILLING SYSTEM AND METHOD

(75) Inventor: Thomas Ross King, Vancouver (CA)

(73) Assignee: Fenix Energy Solutions Ltd., Burnaby, BC (CA)

( * ) Notice: Subject to any disclaimer, the term of this patent is extended or adjusted under 35 U.S.C. 154(b) by 697 days.

(21) Appl. No.: 13/096,939

(22) Filed: Apr. 28, 2011

(65) Prior Publication Data

US 2012/0211281 A1    Aug. 23, 2012

Related U.S. Application Data

(60) Provisional application No. 61/444,060, filed on Feb. 17, 2011.

(51) Int. Cl.
| | |
|---|---|
| E21B 7/02 | (2006.01) |
| E21B 21/06 | (2006.01) |
| E21B 19/00 | (2006.01) |
| B28D 1/14 | (2006.01) |
| E21B 44/00 | (2006.01) |
| E21B 15/00 | (2006.01) |
| E21B 21/015 | (2006.01) |
| F24J 3/08 | (2006.01) |

(52) U.S. Cl.
CPC . *B28D 1/14* (2013.01); *E21B 44/00* (2013.01); *E21B 7/02* (2013.01); *E21B 15/006* (2013.01); *E21B 21/015* (2013.01); *E21B 21/066* (2013.01); *F24J 2003/088* (2013.01)

(58) Field of Classification Search
CPC ......... E21B 7/20; E21B 21/063; E21B 19/16; E21B 21/065; E21B 15/003; E21B 19/00
USPC ............ 175/57, 66, 220, 207; 166/75.11, 901
See application file for complete search history.

(56) References Cited

U.S. PATENT DOCUMENTS

| | | | |
|---|---|---|---|
| 3,626,836 A * | 12/1971 | Schneidler | .................... 454/339 |
| 3,743,035 A | 7/1973 | Tiraspolsky et al. | |
| 4,297,225 A | 10/1981 | Hartley | |
| 4,899,832 A * | 2/1990 | Bierscheid, Jr. | ............... 173/187 |
| 5,228,506 A | 7/1993 | Pearce | |

(Continued)

FOREIGN PATENT DOCUMENTS

| | | |
|---|---|---|
| CA | 2274169 | 7/1998 |
| WO | WO98/28517 | 7/1998 |

*Primary Examiner* — Kenneth L Thompson
*Assistant Examiner* — Michael Wills, III
(74) *Attorney, Agent, or Firm* — Palmer IP

(57) ABSTRACT

A low headroom confined space drilling system is disclosed, comprising a low headroom drilling apparatus, a drilling fluid supply system, a drilling fluid collection system, and a drilling fluid recycling apparatus for supplying a recycled drilling fluid to the drilling apparatus. A method of installing a geoexchange borehole in an interior space of a building is also disclosed, comprising installing a borehole access chamber in a floor slab of a building, positioning a low headroom floor mounted rotary drilling apparatus over the borehole access chamber, providing a pressurized drilling fluid to the drill rod string and powering a rotary downhole drilling device attached to the drill rod string to advance the borehole to a desired depth, recovering a drilling fluid and drill cuttings from the borehole, removing drill cuttings from the recovered drilling fluid using the drilling fluid recycling apparatus and returning a recycled drilling fluid to the drilling apparatus.

15 Claims, 8 Drawing Sheets

(56) References Cited

U.S. PATENT DOCUMENTS

| | | | |
|---|---|---|---|
| 5,975,219 A * | 11/1999 | Sprehe | 175/48 |
| 6,253,864 B1 * | 7/2001 | Hall | 175/415 |
| 7,487,576 B2 * | 2/2009 | Baratta et al. | 29/26 A |
| 7,819,207 B2 * | 10/2010 | Cowan | 175/52 |
| 2004/0049905 A1 | 3/2004 | Jansch | |
| 2007/0163186 A1 * | 7/2007 | Baugh et al. | 52/169.9 |
| 2008/0179090 A1 | 7/2008 | Eia | |
| 2008/0179095 A1 * | 7/2008 | Eia | 175/66 |
| 2008/0283301 A1 * | 11/2008 | Sherwood et al. | 175/206 |
| 2009/0211811 A1 | 8/2009 | Roussy | |
| 2010/0012380 A1 * | 1/2010 | Swadi | 175/57 |
| 2010/0193249 A1 | 8/2010 | Saiz | |
| 2011/0033245 A1 | 2/2011 | Biggs et al. | |
| 2011/0247804 A1 * | 10/2011 | Woolsey | 166/267 |
| 2012/0043136 A1 * | 2/2012 | Alfermann | 175/170 |
| 2012/0097454 A1 * | 4/2012 | Kockeis et al. | 175/57 |
| 2012/0181086 A1 * | 7/2012 | Addison et al. | 175/66 |

\* cited by examiner

LOW HEADROOM CONFINED SPACE GEOEXCHANGE DRILLING SYSTEM AND METHOD

1. RELATED APPLICATIONS

The present application claims priority to previously filed U.S. Provisional Patent Application No. 61/444,060 filed Feb. 17, 2011, the contents of which are herein incorporated by reference in their entirety.

2. TECHNICAL FIELD

The present invention relates generally to installation of geoexchange boreholes for geoexchange heating and cooling systems. More particularly, the present invention relates to a system and method for geoexchange borehole drilling in low headroom confined spaces of new or existing buildings.

3. BACKGROUND

In recent years geoexchange heating and cooling systems have become increasingly popular for new and existing buildings. Conventional geoexchange heating and cooling systems are typically based on the concept of using a geoexchange working fluid flowing through geoexchange piping installed below the ground surface to exchange heat to and from the ground mass surrounding the underground geoexchange piping. Geoexchange piping installations have typically been used either in horizontally oriented buried piping loops, or vertically oriented geoexchange piping loops. In many applications, particularly for use by large multistory buildings and/or closely spaced urban buildings, vertically oriented geoexchange piping installed in vertically drilled boreholes is the only possible option for geoexchange pipe fields, due to the length of piping required and the small available space for installation, particularly in urban areas.

However, conventional borehole drilling techniques and equipment may in many cases not be well suited to installation of vertical geoexchange boreholes for several reasons. Firstly, large multistory buildings may typically require relatively large installed lengths of geoexchange piping, requiring multiple relatively deep boreholes oriented in a grid covering a significant portion of the footprint of the building in order to achieve the required installed piping lengths. Accordingly, for geoexchange system installation in newly constructed buildings, geoexchange boreholes must either be installed under the footprint of the building before construction which typically results in expensive delay of foundation construction and typically difficult access to the bottom of an excavation for drilling equipment. Alternatively for a new building or for all cases of retrofit installation of geoexchange systems in existing buildings, geoexchange boreholes would need to be drilled through the existing foundation slab of the building.

Unfortunately, conventional borehole drilling systems are typically designed for use in largely open areas without strict headroom limits or confined spaces encountered in the bottom levels of most existing and new multistory buildings, which in many cases are reserved for parking garages with less than 7 to 8 foot ceiling heights and confined spaces between walls or pillars. Many conventional borehole drilling systems capable of drilling boreholes through varied hard ground conditions to the several hundred foot depths desirable for modern geoexchange system installations may typically use drill mast lengths of 10 to 40 or more feet, and may be mounted on large truck or tracked rig platforms which cannot access the lower levels of a building.

Further, many conventional borehole drilling systems may typically require use and disposal of large volumes of drilling fluids such as water or drilling mud during drilling, which may be uneconomic or improper for onsite disposal at an urban site, in addition to being potentially messy or hazardous to others in an urban environment. Accordingly, there remains a need for a geoexchange drilling system and corresponding drilling method which address some of the shortcomings of the drilling systems and methods known in the prior art.

4. SUMMARY

It is an object of the present invention to provide a low headroom confined space drilling system that addresses some of the limitations of the prior art.

It is a further object of the invention to provide a method of installing a geoexchange borehole in an interior space of a building that addresses some of the limitations of the prior art.

According to an embodiment of the present invention, a method of installing a geoexchange borehole in an interior space of a building is provided. The method comprises: installing a borehole access chamber in a floor slab of said building at a desired borehole location; positioning a low headroom floor mounted rotary drilling apparatus comprising a drill rod string over the borehole access chamber at the desired borehole location; providing a pressurized drilling fluid to said drill rod string of said drilling apparatus with a drilling fluid supply system and powering a rotary downhole drilling device attached to said drill rod string to advance said borehole to a desired depth; recovering a drilling fluid and drill cuttings returned from said borehole during drilling and removing said drilling fluid and drill cuttings from at least one of said borehole, said borehole access chamber and a drilling fluid splash pan installed over said borehole access chamber and conveying said drilling fluid and drill cuttings to a drilling fluid recycling apparatus using a drilling fluid recovery system; removing at least a substantial portion of said drill cuttings from said recovered drilling fluid and drill cuttings using said drilling fluid recycling apparatus; and returning a recycled drilling fluid substantially cleaned of said drill cuttings to said drilling apparatus using said drilling fluid supply system.

According to another embodiment of the invention, a low headroom confined space drilling apparatus is provided. The drilling apparatus comprises: a floor mounted base frame adapted to be fixedly secured to a floor slab of a building; a drill mast rotatingly mounted to said base frame for elevation to a substantially vertical drilling position; a rotary drill head motor axially extendably mounted to said drill mast for rotating a drill rod string; and an automated drill rod loading apparatus attached to said base frame and comprising a drill rod caddy containing at least one threaded drill rod section and at least one extendable pivoting arm operable to automatically retrieve and handle a threaded drill rod section for attachment to said drill rod string.

According to a further embodiment of the invention, a drilling fluid recycling system for removing at least a substantial portion of drill cuttings particles from a drilling fluid is provided. The drilling fluid recycling system comprises: an inlet for receiving a drilling fluid and drill cutting particle mixture; at least one primary shaking screen particle separator for separating a portion of said drill cuttings particles from said received mixture; at least one primary slurry pump and primary cyclonic particle separator for separating a further portion of said drill cuttings particles from said mixture; at least one secondary shaking screen particle separator for separating yet a further portion of said drill cuttings particles from said received mixture; at least one secondary slurry pump and secondary cyclonic particle separator for separating a final portion of said drill cuttings particles from said mixture and for discharging a recycled drilling fluid stream cleaned of said substantial portion of said drill cuttings particles; at least one drill cuttings hopper for receiving said separated portions of said drill cuttings particles from said primary and secondary shaking screen separators and said primary and secondary cyclonic separators; and at least one disposal container for accumulating said separated drill cuttings particles for disposal.

According to yet a further embodiment of the present invention, a low headroom confined space drilling system is provided. The drilling system comprises: a low headroom confined space drilling apparatus comprising a floor mounted base frame, a pressurized water powered downhole water hammer drill and an automated drill rod loading apparatus attached to said base frame; a drilling fluid supply system comprising at least one water holding tank and a high pressure water pump for supplying pressurized water to said downhole water hammer drill; a drilling fluid collection system comprising at least one drilling fluid collection tank, and at least one sludge lift pump; and a drilling fluid recycling apparatus comprising at least one shaking screen particle separator, at least one cyclonic particle separator, at least one drill cuttings holding hopper and at least one drill cutting disposal container, for providing a recycled drilling fluid stream to said drilling fluid supply system.

Further advantages of the invention will become apparent when considering the drawings in conjunction with the detailed description.

5. BRIEF DESCRIPTION OF THE DRAWINGS

Several embodiments of the present invention will now be described with reference to the accompanying drawing figures, in which.

Similar reference numerals refer to corresponding parts throughout the several views of the drawings.

6. DETAILED DESCRIPTION

Figure 1:
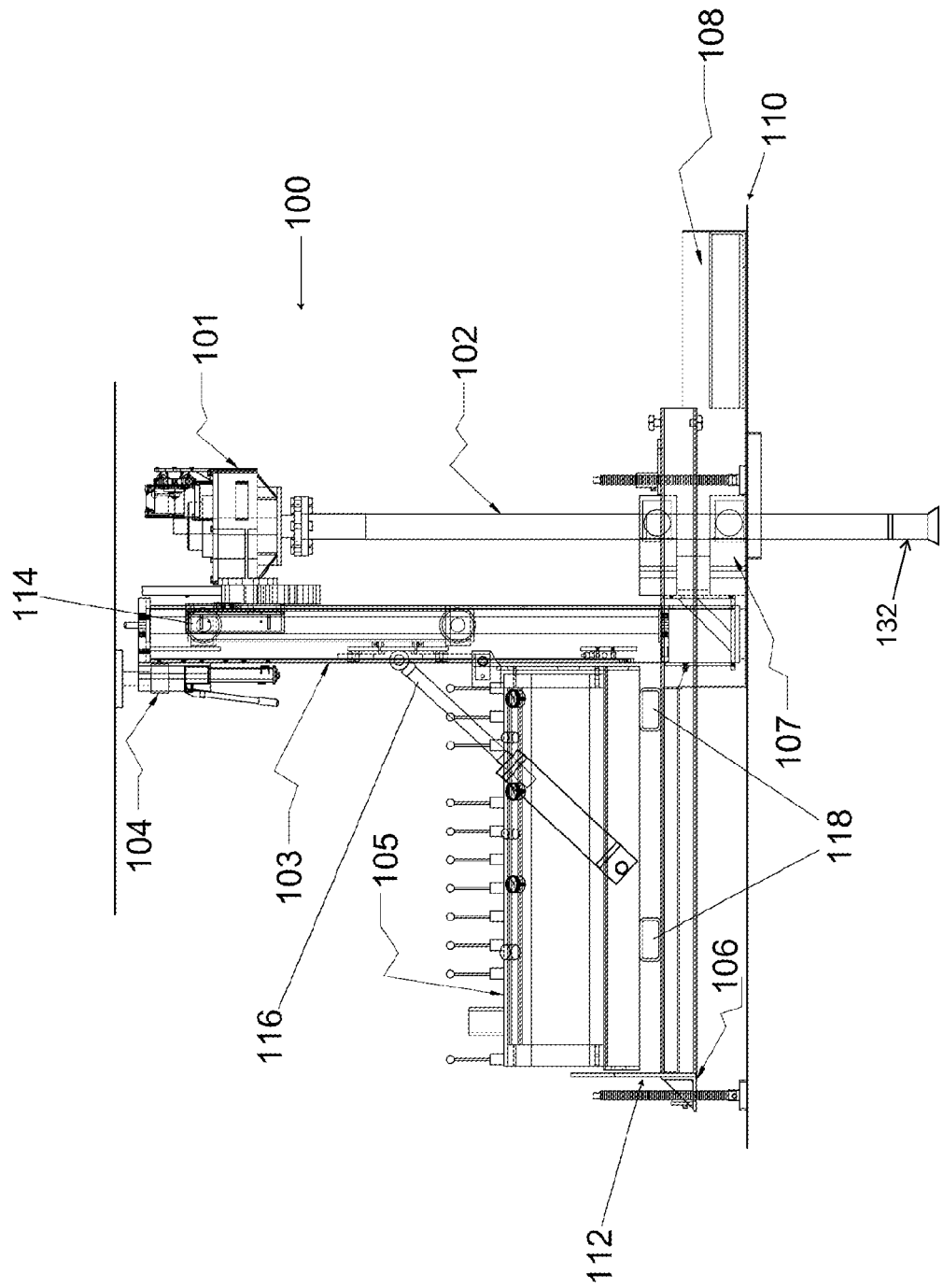
FIG. 1 illustrates an elevation view of an exemplary low headroom drill apparatus according to an embodiment of the present invention.

The present invention will now be further described with reference to the Figures. FIG. 1 illustrates an elevation view of an exemplary low headroom drill apparatus 100 according to an embodiment of the present invention. The low headroom drill apparatus 100 comprises a rotary drill head motor 101 which rotationally drives a drill rod string 102 to enable drilling through the ground below the floor slab 110 of a building or other foundation slab surface, for example. The rotary drill head motor 101 is supported on a drill mast 103 which provides for controllable elevation of the mast 103, such as by an elevation actuator 116, to a substantially vertical drilling position as shown in FIG. 1, or alternatively also to one or more inclined drilling positions, as well as to a lowered or substantially horizontal transport position, for example. The drill mast 103 also desirably comprises a controllable axial drive means 114 to drive movement of the rotary drill head motor 101 in an axial drilling stroke along the axis of the mast 103, such as to advance or withdraw the drill rod string 102 through the ground below the floor slab 110 of a building.

The drill mast 103 is itself attached to and supported by a drill rig base frame 112 which includes floor supports 106 which support the base frame 112 on the floor or foundation slab 110 of a building, or other ground surface, such as to desirably reduce movement of the drill and improve accuracy of borehole location with respect to building structures and services, for example. In one embodiment, the floor supports 106 may comprise leveling jacks to allow leveling of the base frame 112 and thereby the vertical alignment of the drill mast 103 to provide accurate control of drill direction. Floor supports 106 may also desirably comprise attachment means to enable the drill rig base frame 112 to be secured to the foundation or floor slab 110, such as by bolting to the slab 110 thereby desirably providing a secure and stable connection of the low headroom drill apparatus 100 to the slab surface 110, and also to desirably provide a vertical reaction force to facilitate driving the drill rod string 102 into the ground below the slab 110 during drilling, thus reducing the reliance on the weight of the drill apparatus 100 to provide drilling reaction force. Floor supports 106 may also comprise vibration reduction or dampening pads to reduce transmission of vibrations from the drill apparatus 100 to the floor of the building during drilling operation. In one embodiment, drill rig base frame 112 may also comprise transport brackets 118 to facilitate movement of the entire drill rig apparatus 100 by forklift to simplify transport and relocation of drill apparatus 100 within a building using existing load-handling and transport equipment, for example.

In one embodiment, drill mast 103 also desirably comprises double drill pipe clamping jaws 107 affixed to the mast 103, such as near the bottom of the drill mast 103, to allow secure clamping of the drill rod string 102 such as for connecting and/or disconnecting conventional threaded connectors between drill rod segments of drill rod string 102, or to align drill rod string 102 during drilling and/or installation of geoexchange tubing or instrumentation in a borehole, for example. Such double clamping jaws 107 may comprise any suitable type of controllable clamping system, such as opposed arm hydraulic jaws, or electrical jaws, for example. In one embodiment of the invention, the axial drive means 114 of drill mast 103 may comprise any suitable known type of axial stroke drive, such as a chain and sprocket hydraulic motor drive 114, or a functionally similar electrical motor drive or combination thereof, for example. Similarly, elevation actuator 116 mounted between drill rig base frame 112 and drill mast 103 for controlling elevation of drill mast 103 may comprise any suitable controllable actuation system, such as a hydraulic lift cylinder, or electrical actuator, for example. In an optional embodiment, drill mast 103 may further comprise a vertical jack 104 to secure and brace the drill mast 103 to the ceiling of the low headroom confined space in which drilling operations are conducted, such as by extending the vertical jack 104 to bear against the ceiling of the lower level of a building, which may be a parking garage ceiling slab, for example. In such an optional embodiment, vertical jack 104 may comprise any suitable controllably extendable jack mechanism such as a hydraulic or electrically actuated vertical jack 104, for example, which may also desirably provide for at least a portion of the reaction force required to drive the drill rod string 102 into the ground below the foundation or floor slab 110 during drilling.

Drill mast 103 may also desirably comprise a length that is less than the minimum ceiling height in the headroom confined space in which drill system 100 is desired to be used. In a preferred embodiment intended for application to conventional high-rise buildings where the drill system 100 is desired to be used in the lower level of a parking garage or basement area, the drill mast 103 may desirably comprise a length of between about 6-7 feet, thus desirably allowing the use of the low headroom confined space drill system 100 without requiring sub-excavation below the bottom floor of the building, or other onerous measures in order to provide for sufficient vertical clearance for the drill mast 103. In other embodiments for use in buildings with bottom floor ceiling heights of approximately 10 feet, such as offices and/or warehouses, the drill mast 103 may comprise a length of between about 7-9 feet, for example. In one embodiment, the drill rod 102 may also desirably be adapted for use with the reduced length of the drill mast 103, such that segments of drill rod 102 are dimensioned suitably to fit within the allowable drill stroke of drill mast 103. In an embodiment where drill mast 103 is between about 6-7 feet in length, drill rod 102 may desirably be provided in segments of approximately 3 feet, or about 1 meter in length, for example. Further, drill rod 102 may be provided in any suitable diameter for use in a desired application such as for drilling of geoexchange boreholes to house loops of geoexchange tubing, in which case a drill rod diameter of between about 3 and 6 inches may be used, according to one preferred embodiment.

In one embodiment of the present invention, rotary drill head motor 101 may comprise any suitable known type of rotary drive motor adapted for the high driving torque requirements for use in driving a drill rod string 102 into varied ground conditions during drilling operation. In one such embodiment, rotary drill head motor 101 may comprise one or more hydraulic motors driving a geared transmission to transmit rotary power to the drill rod string 102. In another embodiment, rotary drill head motor 101 may comprise one or more electrical motors driving such a geared transmission to drive rotation of drill rod string 102. In a preferred embodiment, rotary drill head motor 101 may comprise a K40 J200 drill head motor such as is available from Techno Drill Inc. and Renown Gears Ltd.

In one embodiment of the invention, drill apparatus 100 may further comprise one or more drill controls 105, such as multiple manual hydraulic and/or electric control levers or switches, as may be known in the field and suitable for controlling the individual functions of the drill apparatus 100. In an optional embodiment, drill controls 105 may comprise an automated and/or digital electronic control system which may control at least a portion of the drill system 100 functions. In a preferred embodiment, drill controls 105 may provide for automated logging and recording of drilling operation and progress including such factors as drilling conditions and corresponding drill control settings (such as torque, stroke, drilling reaction force, etc.), borehole orientation (such as by use of a downhole inclinometer), and drill system operation, and may further provide for automatic and/or manual control of at least a portion of drill functions during operation as may be desired for use in applications where multiple geoexchange boreholes may be drilled in very similar ground conditions in relatively closely spaced grids, as may be common in geoexchange system installation beneath new or retrofitted buildings, for example.

In another exemplary embodiment, drill rod string 102 may be adapted for use with any suitable known rotary drilling technique, such as air rotary, mud rotary, hydro- or pressurized water rotary, or reverse circulation rotary drilling, for example. In one such embodiment, drill rod string 102 may comprise an air-powered downhole drill hammer for use in compressed air rotary drilling, where compressed air is forced down the center of the drill rod 102 to power the downhole air hammer, and drill cuttings are blown back up the outside of the drill rod 102 to the surface. In another such embodiment, drill rod string 102 may be adapted for use in mud rotary drilling, where drilling mud is forced down the drill rod 102 to return drill cuttings up the outside of the drill rod 102. In yet a further embodiment, drill rod 102 may be annular in construction for use in reverse circulation air drilling where compressed air is forced down the annulus of the drill rod 102 to return drill cuttings up the center of the drill rod 102. In a preferred embodiment, drill rod string 102 may comprise a rotary downhole drilling device 132, such as a compressed water powered downhole hammer bit at the bottom, and pressurized water may be forced down the center of the drill rod 102 to power the downhole hammer 132, and also to return drill cuttings up the outside of the drill rod 102.

In one embodiment of the present invention adapted for use with air, mud and/or pressurized water rotary drilling techniques, drill rig base also comprises a drip or splash pan 108 which surrounds the borehole and drill rod string 102 so as to collect water/drilling fluids and drill cuttings to prevent damage of the building floor and to prevent leakage and reduce mess. In one embodiment, splash pan 108 may be dimensioned sufficient to cover the entire footprint of the drill apparatus 100, so as to better provide protection to the building floor surface. In another preferred embodiment, splash pan 108 may comprise a collar or fitting around drill rod 102 and the drilled borehole, so as to channel any collected drilling fluids/water or drill cuttings from the splash pan back to the borehole around the drill rod 102. In a further such embodiment, a borehole access enclosure or chamber may be formed in and/or below the building floor around the borehole, and the splash pan may desirably channel any collected drilling fluids/water or drill cuttings into the borehole access chamber, such as to reduce leakage onto the building floor, or to allow for pumping from the borehole access chamber for collection and disposal, for example.

Figure 2:
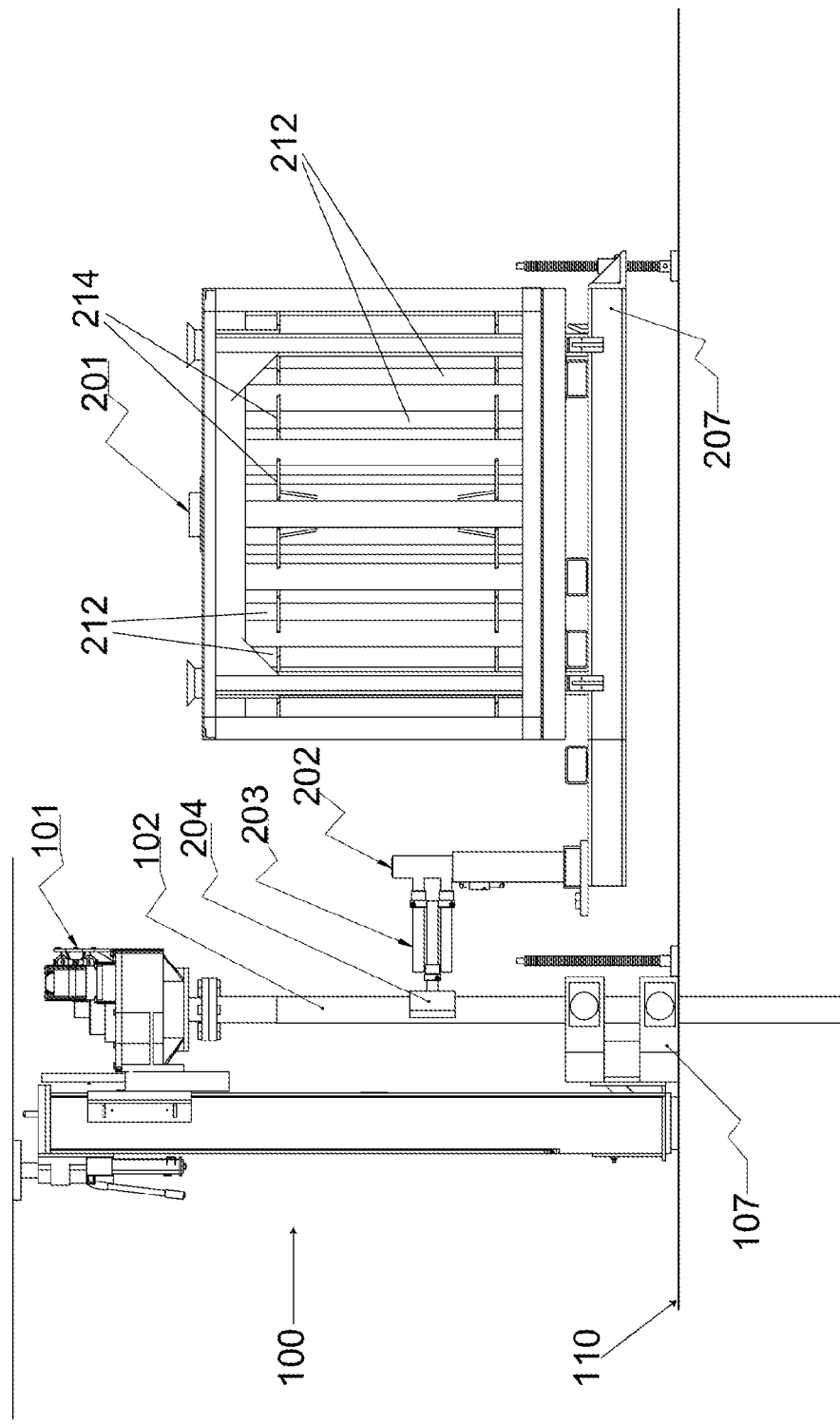
FIG. 2 illustrates an elevation view of an exemplary low headroom drill and associated automated drill rod loading apparatus, according to an embodiment of the invention.

Referring now to FIG. 2, an elevation view of an exemplary low headroom confined space drill apparatus 100 and associated automated drill rod loading apparatus 201 is shown, according to an embodiment of the invention. Drill rod loading apparatus 201 provides vertical storage of multiple sections of drill rod 212 held by vertical supports 214 within a moveable drill rod loading caddy 201 mounted on a loader base frame 207 which is supported on the floor or foundation slab 110 of a building or structure. The drill rod loading apparatus 201 provides for repositioning of drill rods within the loading apparatus 201 such as along a powered snail feed mechanism (not shown) to move drill rod sections 212 within the caddy 201 towards or away from a telescopic drill rod loader arm 203, and thereby provide drill rod sections 212 to the low headroom drill apparatus 100 during advancement of drill rod string 102, and withdraw drill rod sections 212 from the drill apparatus 100 during withdrawal of the drill rod string 102 from the borehole (may typically be referred to as tripping the drill string into or tripping the drill string out of the borehole).

The telescopic drill rod loader arm 203 comprises a drill rod grabber clamp 204 at its free end suited to grasping drill rod sections 212, and is attached to a rotating telescopic pivot shaft 202 at its other end. The telescopic pivot shaft 202 is supported on the loader base frame 207, so as to provide for controllable pivoting movement of the loader arm 203 between a position for loading/unloading drill rod sections 212 to/from the low headroom drill apparatus 100, and a position for receiving/storing drill rod sections 212 from/to the drill rod loading apparatus 201.

Accordingly, the drill rod loading apparatus 201 is operable to pick up a drill rod section 212 from the drill rod caddy and provide a drill rod section 212 with the loader arm 203 to the low headroom drill 100 when the drill rod string 102 is clamped by drill clamp 107 and the rotary drill head motor 101 is raised to the top of its stroke, so that the added drill rod section 212 is then rotated by the drill head motor 101 to threadingly attach it to the top of the drill rod string 102 in preparation for advancement of the drill rod string 102 down into the borehole. Conversely, the drill rod loading apparatus 201 is also operable to remove a drill rod section 212 from the low headroom drill 100 with the loader arm 203 after the drill rod section has been unthreaded from the drill rod string 102 by the drill head motor 101, and to store the removed drill rod section 212 in the drill rod loader caddy 201, in preparation for withdrawing the drill rod string 102 from the borehole.

In one embodiment of the invention, the drill rod loading apparatus 201 may desirably be automatically controllable provide and/or store sections of drill rod 212 to and/or from the low headroom drill 100 in synchronization with the movement of the drill head motor stroke of the drill 100. In one such embodiment, the loader base frame 207 may be connected to the low headroom drill 100 to align the drill rod loading caddy 201 and loader arm 203 with the position of the drill 100, and the drill rod loading apparatus 201 may also desirably be powered and/or controlled by the low headroom drill 100 so as to provide for synchronized and automated operation of the drill rod loading apparatus 201 corresponding to the movement of the drill head motor 101 along the stroke cycle of the drill 100 depending on whether the drill 100 is advancing or withdrawing the drill rod string 102 to or from the borehole.

Figure 3:
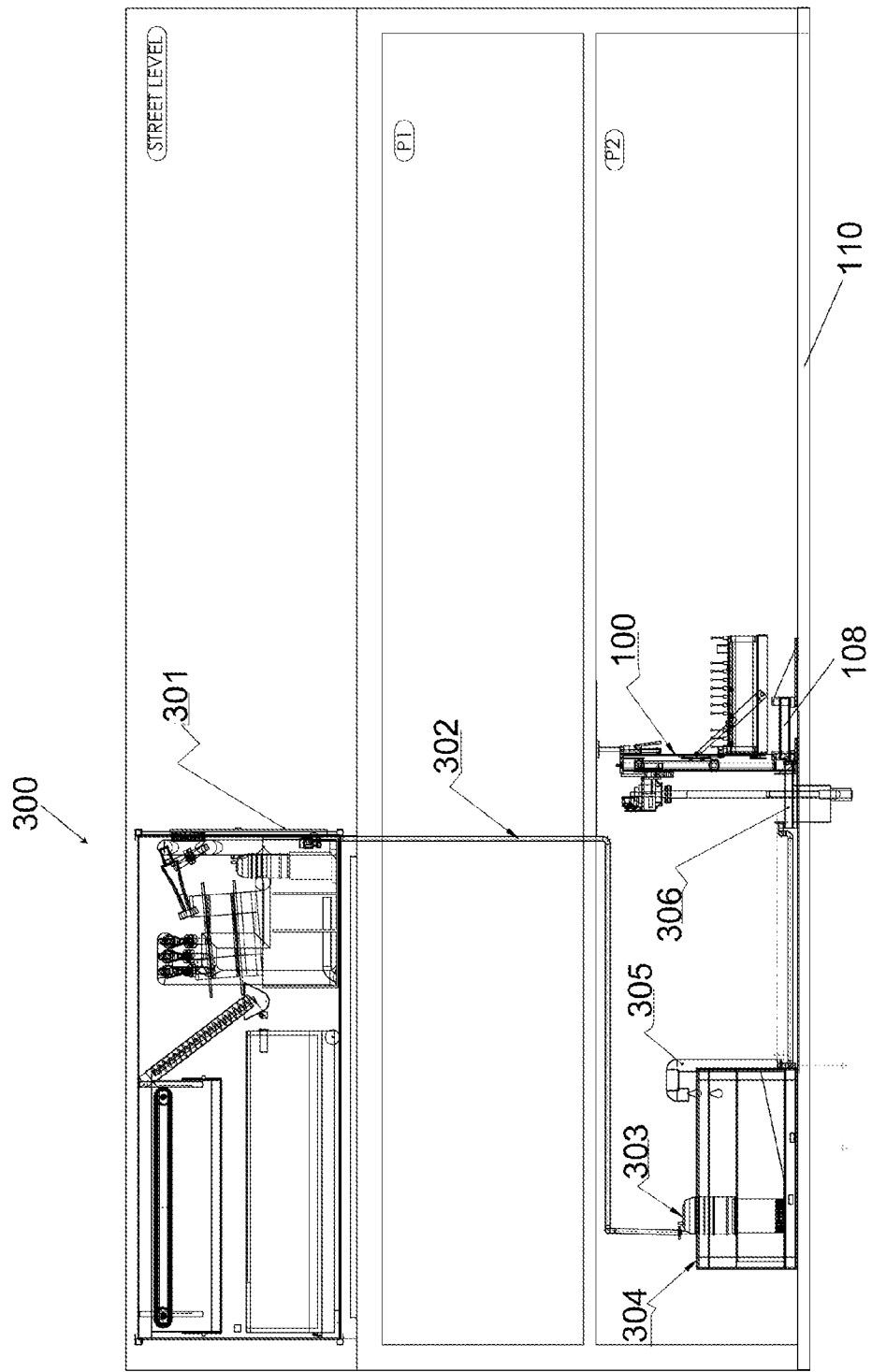
FIG. 3 illustrates a cross sectional elevation view of an exemplary low headroom confined space drilling fluid collection system, according to an embodiment of the invention.

Referring now to FIG. 3, a cross sectional elevation view of an exemplary low headroom confined space drilling fluid collection system 300 is shown, according to an embodiment of the invention. In one embodiment, drilling fluid collection system 300 comprises low headroom drill apparatus 100, drilling fluid collection and surge tank 304 and drilling fluid recycling apparatus 301. In one embodiment, the drill apparatus 100 and drilling fluid collection and surge tank 304 may typically both be located at the bottom level of a building where the drill apparatus 100 is operated for drilling boreholes through the foundation or floor slab 110 of the building, such as for installation of geoexchange piping loops beneath the footprint of the building, for example. In a typical such embodiment, the drilling fluid recycling apparatus 301 may desirably be located at a street level or other easily accessible level of the building, or outside the building, as may be advantageous for easy access and operation of the drilling fluid recycling apparatus 301 and removal of waste drill cutting materials from the recycling apparatus 301, which may typically be more difficult and costly and/or less efficient if the recycling apparatus 301 were required to be co-located by the drill apparatus at the bottom level of the building. However, in other optional embodiments, drilling fluid collection and surge tank 304 may optionally be located on another level or at another location of the building from the drill apparatus 100, as may be desired or required due to operational factors such as space, location of building services or utilities, or ongoing construction or utilization of the building during drilling, for example. Also, in other optional embodiments, drilling fluid recycling apparatus 301 may be located near or on the same level as the drill apparatus 100 depending upon similar operational factors as discussed above.

The drill apparatus 100 comprises a splash pan 108 for collecting and containing drilling fluids and drill cuttings returned to the top of the borehole by injection of drilling fluid down the drill rod string into the borehole during drilling, and any leakages or splashes of drilling fluid from the drill rig apparatus itself during operation. In one embodiment, the drilling apparatus 100 also comprises a borehole access chamber 306 extending around the borehole and beneath the foundation or floor slab 110, to enable access to the borehole through the slab 110, and also to act as a collection point or reservoir for the drilling fluid and drill cuttings accumulated in and returning to the surface from the borehole. In a particular embodiment, the borehole access chamber 306 may comprise a solid enclosure or pot installed in and preferably also below the foundation or floor slab 110 of the building at the location of the borehole. In a preferred embodiment, the splash pan 108 of the drill apparatus 100 may desirably function to substantially seal to the borehole access chamber or pot 306, so as to conduct excess drilling fluid from the borehole and borehole access chamber 306 into the splash pan 108, and to conduct excess drilling fluid collected in the splash pan 108 to the borehole access chamber 306, desirably without leakage.

In one embodiment, the borehole access chamber 306 and/or the splash pan 108 of the drilling apparatus 100 may be fluidly connected to the drilling fluid collection and surge tank 304 by drilling fluid collection line 305, which may comprise any suitable pipe or hose, for conducting drilling fluid and/or drill cuttings from the drilling apparatus 100 to the collection and surge tank 304. In a particular embodiment, drilling fluid collection line 305 may conduct flow of drilling fluid and/or drill cuttings from the drilling apparatus 100 by means of gravity flow, however in other embodiments, drilling fluid collection line 305 may comprise a collection pump or other pumping means to pump drilling fluid and/or drill cuttings from the drill apparatus 100 to the collection and surge tank 304. In one particular embodiment, drilling fluid collection line 305 may drain into collection tank 304 in such a manner that the stream of collected drilling fluid/cuttings may be visible to an operator of the drill apparatus 100, or to another operator, so that the visual characteristics of the collected drilling fluid/cuttings may be determined during drilling, and/or so that samples of the collected drilling fluid/cuttings may be taken during drilling, for example.

Drilling fluid collection and surge tank 304 may desirably comprise at least one sludge pump 303 suitable for pumping drilling fluid and/or drill cuttings from the collection and surge tank 304 to a drilling fluid inlet of the drilling fluid recycling apparatus 301 by means of a sludge lift line 302, which may comprise any suitable type of pipe and/or hose operable to fluidly connect the tank 304 and recycling apparatus 301 and transport drilling sludge (drilling fluid and/or drill cuttings) to the recycling apparatus 301 inlet for recycling of drilling fluid. In one embodiment the sludge pump may comprise a high head sludge lift pump 303 suitable for pumping drilling fluid and/or drill cuttings sludge at high head through the sludge lift line 302 to the recycling apparatus 301 which may in some embodiments be located on a higher level of the building, or outside the building, such as at the street level or another easily accessible location, for example. In such case, the drilling fluid collection and surge tank 304 may desirably be dimensioned to act as an overflow surge collector tank to accept and contain drilling fluid sludge from the sludge lift line 302 when sludge lift pump 303 stops operating, for example. Drilling fluid recycling apparatus 301 is desirably operable to accept drilling fluid sludge from sludge lift line 302 for recycling of drilling fluids and separation of drill cuttings and waste, as described in further detail below in reference to FIGS. 5-7, for example.

In another optional embodiment, drilling fluid collection and surge tank 304 may be connected to two or more drill rigs 100, so as to provide for collection of drilling fluids and/or drill cuttings from two or more boreholes. In such case, tank 304 and sludge lift pump 303 may desirably be selected and sized to provide sufficient capacity for accepting the volume of drilling fluids/cuttings from two or more drill rigs 100 during simultaneous drilling operation, and to pump the generated drilling fluid/cuttings to the drilling fluid recycling apparatus 301 through sludge lift line 302.

Figure 4:
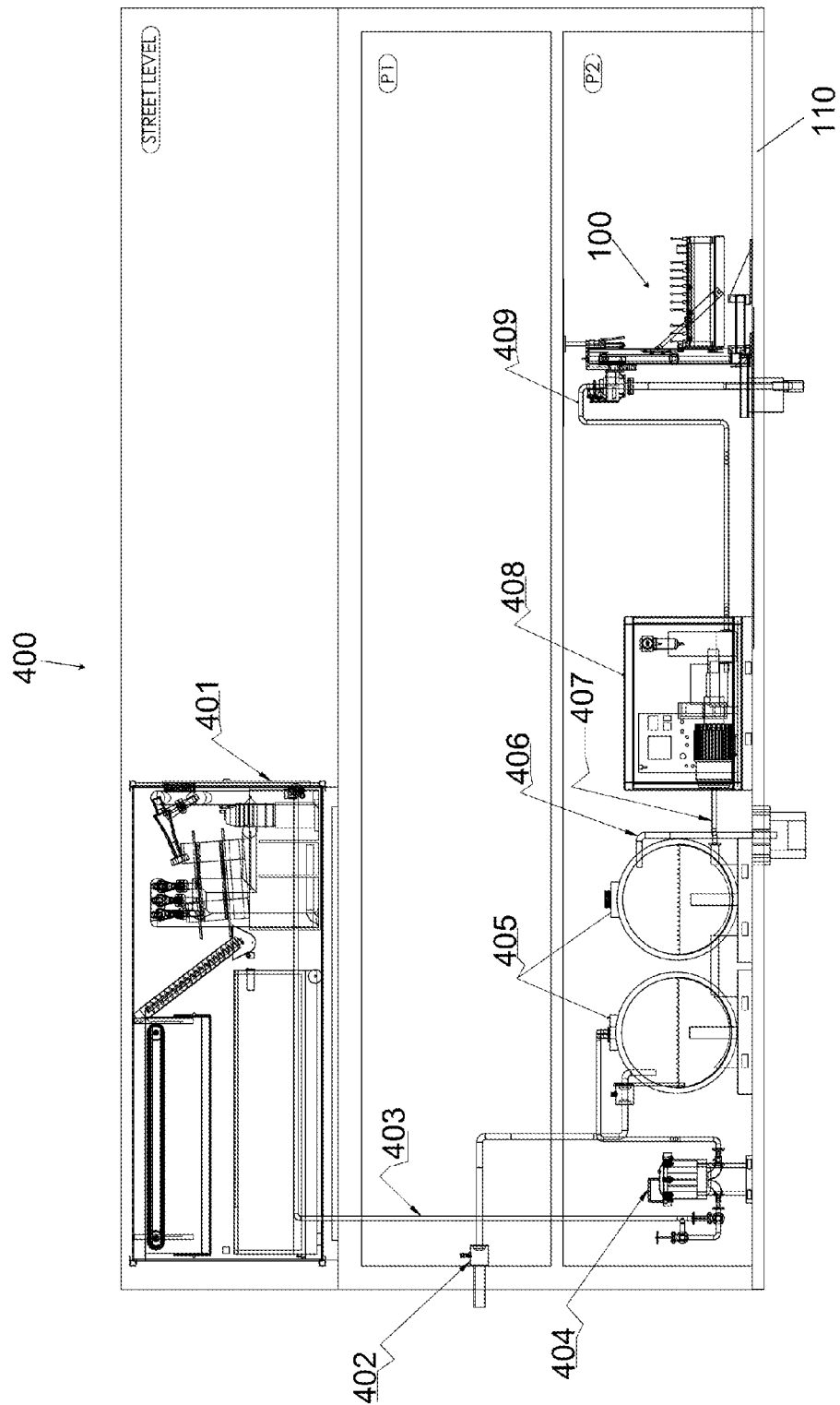
FIG. 4 illustrates a cross sectional elevation view of an exemplary low headroom confined space drilling fluid supply system, according to an embodiment of the invention.

Referring now to FIG. 4, a cross sectional elevation view of an exemplary low headroom confined space drilling fluid supply system 400 is shown, according to an embodiment of the invention. According to one embodiment, drilling fluid supply system 400 comprises drilling fluid recycling apparatus 401, one or more drilling fluid holding tanks 405, drilling fluid pump 408 and drill apparatus 100. In one embodiment, the drill apparatus 100, drilling fluid holding tanks 405 and drilling fluid pump 408 may typically all be located at the bottom level of a building where the drill apparatus 100 is operated for drilling boreholes through the foundation or floor slab 110 of the building, such as for installation of geoexchange piping loops beneath the footprint of the building, for example. In a typical such embodiment, the drilling fluid recycling apparatus 401 may desirably be located at a street level or other easily accessible level of the building, or outside the building, as may be advantageous for easy access and operation of the drilling fluid recycling apparatus 401 and removal of waste drill cutting materials from the recycling apparatus 401, which may typically be more difficult and costly and/or less efficient if the recycling apparatus 401 were required to be co-located by the drill apparatus 100 at the bottom level of the building. However, in other optional embodiments, one or more of drilling fluid holding tanks 405 and drilling fluid pump 408 may optionally be located on another level or at another location of the building from the drill apparatus 100, as may be desired or required due to operational factors such as space, location of building services or utilities, or ongoing construction or utilization of the building during drilling, for example. Also, in other optional embodiments, drilling fluid recycling apparatus 401 may be located near or on the same level as the drill apparatus 100 depending upon similar operational factors as discussed above.

According to one embodiment, drilling fluid (such as water or drilling mud or other drilling fluids as may be used in various known drilling methods) may be output from an outlet of drilling fluid recycling apparatus 401 where it has been substantially cleaned of drill cuttings, into a cleaned drilling fluid return line 403, which may comprise any suitable type of pipe or hose, for example. Cleaned drilling fluid may then be conducted by return line 403 either directly to one or more drilling fluid holding tanks 405, or, optionally first to one or more drilling fluid polishing filters 404. In one embodiment, drilling fluid polishing filters 404 may comprise one or more suitable fluid filters such as bag and/or belt filters, which may be suitable to provide a final level of cleaning of the drilling fluid received from the recycling apparatus 401, depending upon the drilling fluid input requirements of the particular drilling apparatus 100 and drilling method require. For example, in one such optional embodiment where water is used as the primary drilling fluid, filter 404 may comprise a polishing water filter such as a bag and/or belt type water filter suitable to provide a final polishing filtration step to ensure the recycled drilling water returned from recycling apparatus 401 is suitable for use in an exemplary downhole water hammer type hydraulic drill apparatus 100, for example. In such an embodiment, the recycled drilling water may then be conducted from the final polishing filter 404 to the one or more drilling fluid holding tanks 405, for storage and control of the recycled drilling fluid prior to utilization in the drilling apparatus 100.

According to an embodiment of the invention, drilling fluid supply system 400 may also comprise a domestic water makeup source 402, for providing additional clean water into the drilling fluid supply system, such as to maintain a suitable volume of drilling fluid for supply to one or more drill rigs 100. The one or more drilling fluid storage tanks 405 may be of any suitable size and construction as may be known for providing a required volume of drilling fluid as may be required by one or more drill rigs 100 during drilling operation. After storage of recycled drilling fluid in holding tanks 405, the drilling fluid may be supplied to drilling fluid pump 408 through pump supply line 407, which may comprise any suitable known pipe or hose for providing clean drilling fluid to the drilling fluid pump 408. Drilling fluid holding tanks 405 may also optionally comprise one or more overflow discharge lines 406 so as to prevent overflow of the holding tanks 405. Such overflow lines may run to any suitable sink for an overflow of drilling fluid, such as a storm or sewer drain, an unsealed borehole, or ground drain, for example. In one embodiment, a drilling fluid mixing reservoir may also be comprised in the recycled drilling fluid supply system 400, such as between the holding tanks and the drilling fluid pump 408, for example, to allow for mixing of additives into the drilling fluid, as may be desired for certain types of drilling techniques and/or drill rigs 100, such as for use in mud rotary drilling, for example. In a preferred such optional embodiment, any required drilling fluid additives may be added to the recycled drilling fluid in the holding tanks 405.

In one embodiment, drilling fluid pump 408 may comprise a high pressure water pump, and may supply recycled clean drilling water at high pressure to the drill head of the drill apparatus 100 through high pressure drill supply line 409, such as for use to power a high pressure water downhole hammer type drilling system 100. In another embodiment, drilling fluid pump 408 may comprise a low pressure drilling fluid pump, and may supply a low pressure recycled drilling fluid such as drilling mud or drilling water to the drill head of the drill apparatus 100 through a low pressure drill supply line 409, such as for use in a low pressure mud rotary or water rotary drilling system 100, for example. In other embodiments, drilling fluid pump 408 may provide high and/or low pressure drilling fluid to the drill apparatus 100 as may be require for any suitable desired type of drill and drilling method known in the art. In a preferred embodiment, drilling fluid pump 408 may desirably be electrically powered in order to provide for reduced emissions for an indoor or underground environment, and/or to reduce the footprint of the drilling system, as may be desirable for operation of the drilling apparatus 100 in an indoor building environment, for example.

Figure 5:
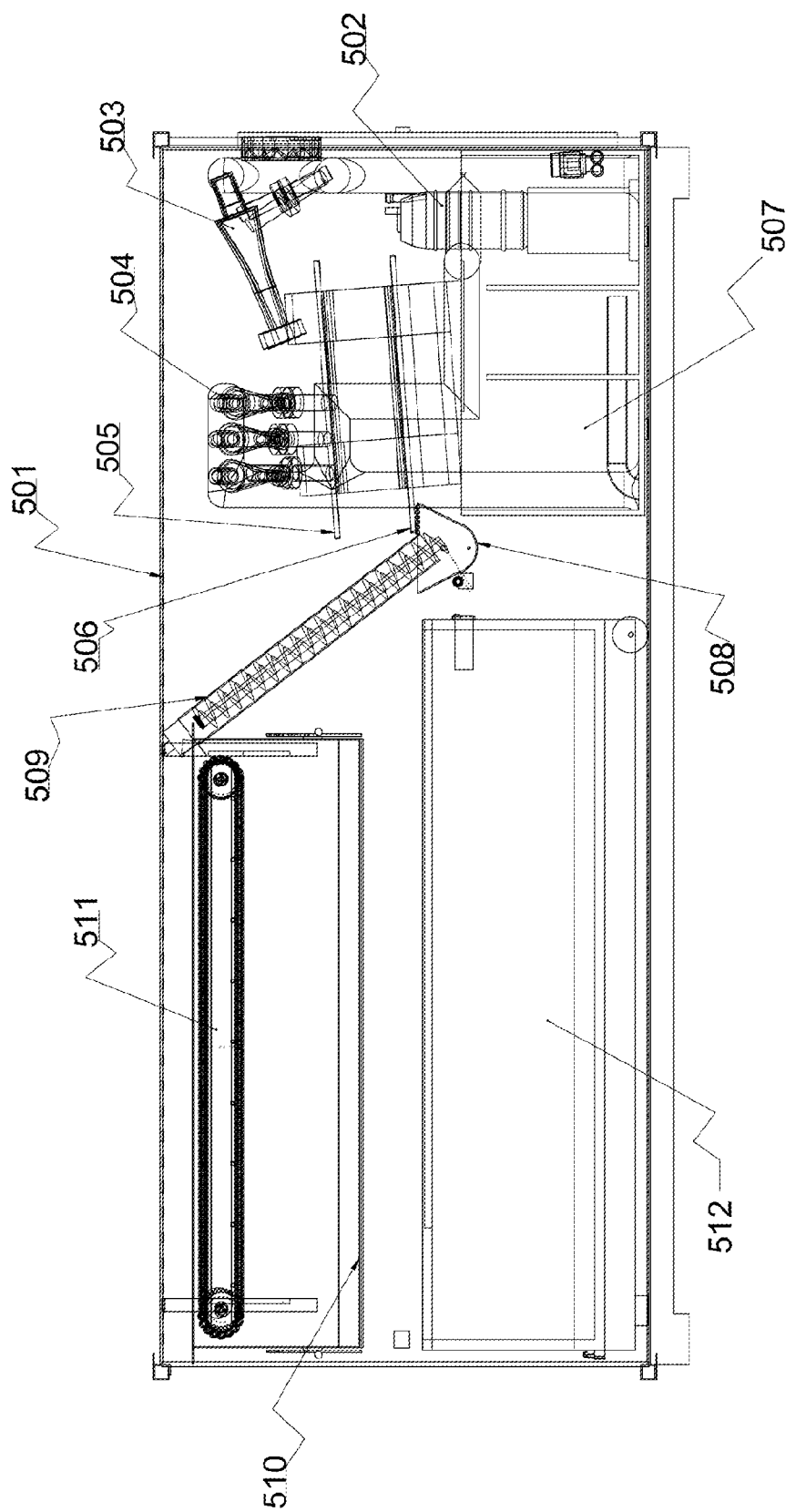
FIG. 5 illustrates a cross sectional elevation view of an exemplary drilling fluid recycling apparatus, according to an embodiment of the present invention.
Figure 6:
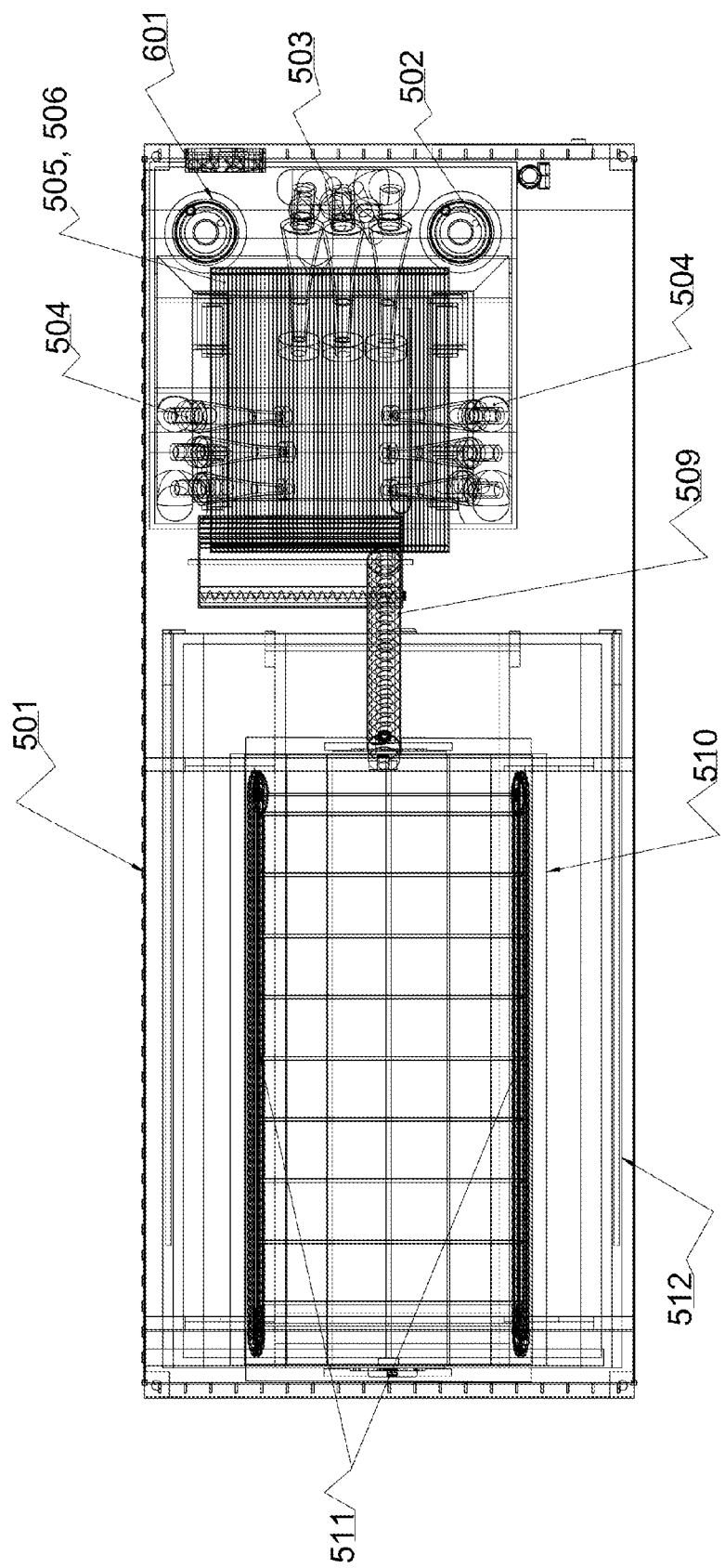
FIG. 6 illustrates a cross sectional plan view of an exemplary drilling fluid recycling apparatus, according to an embodiment of the present invention.

Referring now to FIGS. 5 and 6, cross sectional elevation and plan views of an exemplary drilling fluid recycling apparatus 501 are shown, respectively, according to an embodiment of the present invention. In one embodiment, the drilling fluid recycling apparatus 501 may be desirably housed within a suitable enclosure, such as a standard shipping container (which in one embodiment may be approximately 20 feet in length), for example, to provide appropriate containment of drilling fluids, drill cuttings, waste materials and noise, and for protection of the public and exterior appearance, such as may be desirable for use in urban areas, such as on a street, sidewalk, laneway or ground floor inside or outside of a building, as may be required for construction site use in an urban environment, for example. In a particular embodiment, the drilling fluid recycling apparatus 501 may comprise at least one shaker screen particle separator 506, one or more cyclonic particle separators 503, a cuttings collection hopper 508, a particle feeder 509, a particle spreader 511, an upper holding hopper 510, and a disposal transport container 512.

In a particular embodiment, drilling fluid and drill cuttings as a combined sludge and/or sludge and fluid suspension are received at an inlet of the drilling fluid recycling apparatus 501 from the sludge lift line 302 of the drilling fluid collection system 300. The received drilling fluid/cuttings sludge is passed onto at least one primary or coarse shaker screen particle separator 506 in order to separate the coarsest drill cuttings particles from the drilling fluid/cuttings. The separated coarse particles from the top of the at least one coarse shaker screen 506 then fall off the lower end of the inclined coarse shaker screen separator 506 and into the drill cuttings collection hopper 508. The remaining drilling fluid and cuttings particles passing through the coarse screen separator 506 are then fed into a primary fluid pump 502 and are pumped at a suitably high pressure to at least one primary cyclonic particle separator 503. The at least one primary cyclonic separator 503 then separates a portion comprising relatively coarser cuttings particles from the drilling fluid/cuttings slurry, and the separated coarser particles discharged from the narrow end of the at least one primary cyclonic separator 503 are deposited onto at least one secondary or fine shaker screen particle separator 505 for further separation of finer cuttings particles which are retained on the at least one secondary shaker screen 505 and fall off the end of the secondary screen 505 into the cutting collection hopper 508. The remaining drilling fluid and fine cuttings particles are discharged from the upper (wider) end of the primary cyclonic separator(s) 503 and are transferred into a baffled collection tank 507 beneath the cyclonic separator(s) 503 and shaker screens 505, 506.

The remaining drilling fluid and fine cuttings particles passing through the secondary or fine shaker screen 505 drop down into the baffled collection tank 507 beneath the shaker screens, along with the "clean" upper end discharged drilling fluid/cuttings from the primary cyclonic separator(s) 503. Subsequently, the contents of the baffled collection tank 507 are fed into a secondary fluid or slurry pump 601 and pumped at a suitably high pressure to one or more secondary cyclonic particle separator(s) 504. The one or more secondary cyclonic separator(s) 504 then separate the finest cuttings particles from the drilling fluid in the baffled collection tank 507, and the separated particles discharged from the lower narrow end of the secondary cyclonic separator(s) 504 are deposited onto the at least one secondary or fine shaker screen 505, to be transferred to the collection hopper or if through the secondary shaker screen 505, then back to the baffled collection tank 507. Meanwhile, the cleaned drilling fluid discharged through the upper (wider) end of the secondary cyclonic separator(s) 504 is then discharged from the drilling fluid recycling apparatus 501 at an outlet thereof, in order to be returned to the drilling fluid supply system 400 through drilling fluid return line 403 for reuse by the drilling apparatus 100.

In one exemplary embodiment of the invention, multiple primary cyclonic separators 503 may be employed for primary (coarse) cyclonic separation, such as using three exemplary 6 inch nominal diameter turbo cyclone separators 503. In another exemplary embodiment, multiple secondary cyclonic separators 504 may also be employed for secondary (fine) cyclonic separation, such as using six exemplary 3 in nominal diameter turbo cyclone separators 504. Further, the primary and secondary shaker screen particle separators 506 and 505 may comprise any suitable known type of shaker screen separator suited to separate appropriate drill cutting particle sizes desired for a particular drilling fluid and drilling technique and for drilling conditions at a particular site, for example. In a further embodiment, power for operation of the separation devices and material handling components of the drilling fluid recycling apparatus 501 may be provided either by the power system for the drilling apparatus 100, or alternatively by another suitable power source, such as an outside generator, or building power system as may be suitable or desirable for a particular application.

Once drill cuttings particles have been collected in cuttings collection hopper 508, particle feeder 509 is used to transport the cuttings up to an upper holding hopper 510 where the cuttings may be stored or held until removal from the recycling apparatus 501 for disposal. In one embodiment, the collection hopper 508 may also comprise a horizontal auger, conveyor or other suitable horizontal material feeder to move cuttings particles along the bottom of the collection hopper 508 towards a feed inlet for the inclined or vertical particle feeder 509. In another embodiment, the particle feeder 509 may comprise an inclined or vertical rotary screw auger suitable for moving cuttings particles up to fall into the upper holding hopper 510. In an alternative embodiment, other particle feeder means may be utilized, such as an inclined conveyor or bucketwheel or the like.

Upper holding hopper 510 may desirably also comprise a particle or material spreader 511 to receive the cuttings particles from the particle feeder 509 and spread them over the length of the upper holding hopper or container 510 to avoid overfilling of one end of the hopper 510. In one embodiment, particle spreader 511 may comprise a chain driven series of transverse spreader bars operable to move material from the particle feeder 509 at one end of the hopper 510 towards the other end of the hopper 510, for example. Upper holding hopper 510 also comprises one or more controllable dumping gates at the bottom thereof, to enable periodic dumping of cuttings materials into a disposal container 512 located below the holding hopper 510. In a preferred embodiment, the disposal container 512 may comprise a standard roll-on/roll-off dumpster container which is mounted on wheels or rails and may be easily removed by a disposal truck for transport to a disposal site for disposal of drill cuttings, and may be easily replaced in the recycling apparatus 501 after emptying. In one embodiment, the holding hopper 510 may comprise two clamshell type dumping gates to facilitate dumping of retained cuttings material into the lower disposal container or dumpster 512.

Figure 7:
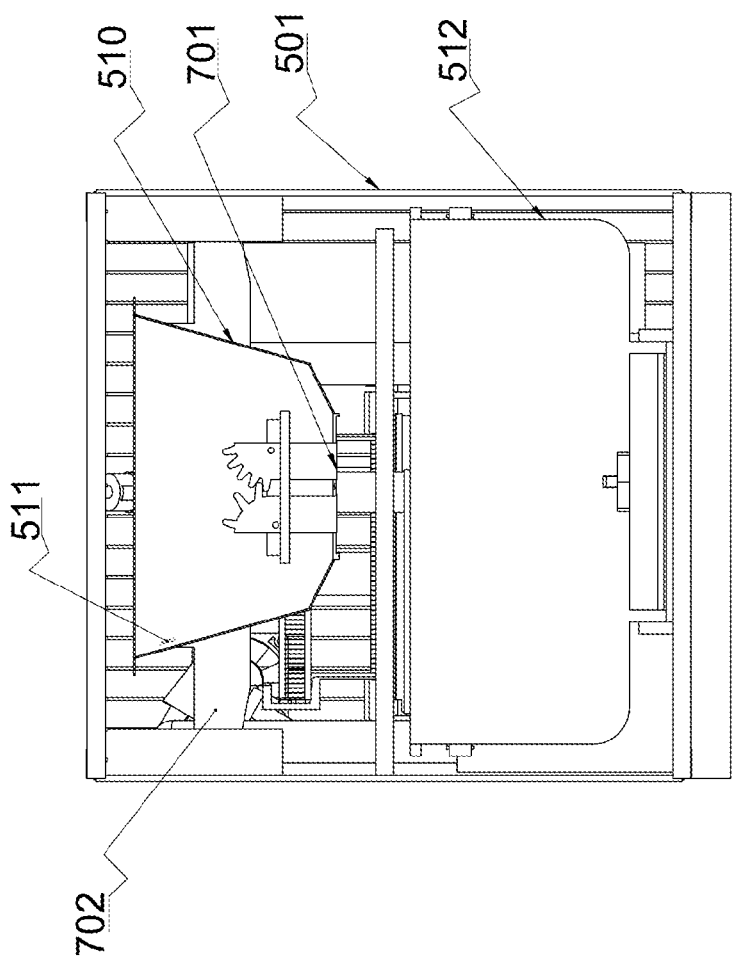
FIG. 7 illustrates a cross sectional end view of an exemplary drilling fluid recycling apparatus, according to an embodiment of the present invention.

Referring now to FIG. 7, a cross sectional end view of an exemplary drilling fluid recycling apparatus 501 is shown, according to an embodiment of the present invention. Similar to as shown in FIGS. 5 and 6, drilling fluid recycling apparatus 501 comprises an upper holding hopper 510 supported from the structure of the enclosure of recycling apparatus 510 by at least two support arms 702 located on either side of the hopper. As described above, the upper holding hopper 510 functions to enable collection and retention of drill cuttings particles separated from the drilling fluid between disposal intervals when the disposal container 512 below the upper hopper 510 may be removed from the recycling apparatus 510. In a particular embodiment, upper holding hopper 510 comprises at least two controllable dump gates 701 located at the bottom of the hopper 510 which may be opened to dump the drill cutting contents of the holding hopper 510 into the disposal container 512.

In one embodiment, dump gates 702 may comprise hinged clamshell style dump gates 702 which may be actuated by hydraulically or electrically operated gear arms to control opening of the gates for dumping drill cuttings into disposal container 512. In another particular embodiment, the enclosure of drill fluid recycling apparatus 501 may also comprise a door (not shown) which may be closed over the end of the enclosure when the disposal container 512 is not being accessed, in order to better contain any cuttings, fluids, dust or noise from the outside public environment or indoor building environment in which the recycling apparatus 100 is being operated.

Figure 8:
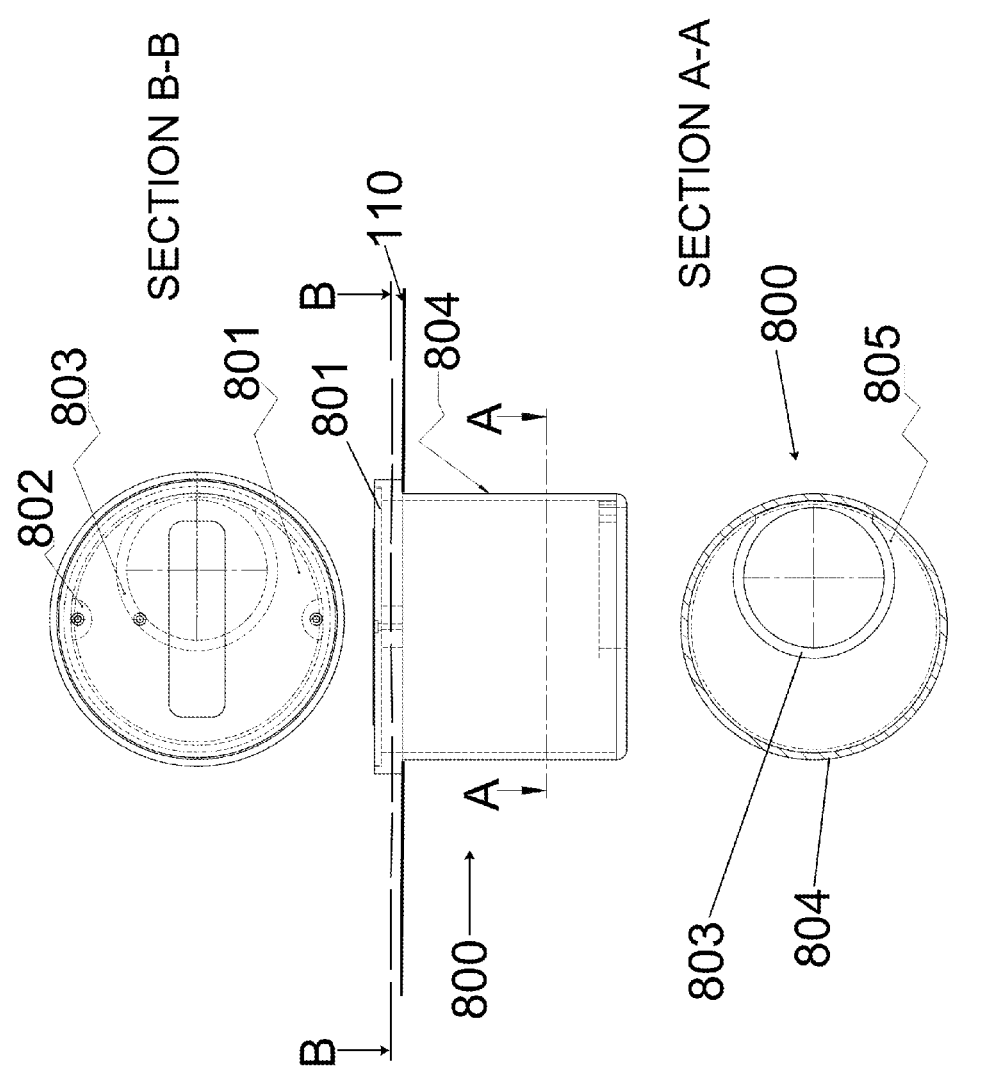
FIG. 8 illustrates cross sectional plan and elevation views of an exemplary borehole access chamber apparatus, according to an embodiment of the invention.

Referring to FIG. 8, cross sectional plan and elevation views of an exemplary borehole access chamber apparatus 800 are shown, according to an embodiment of the invention. Borehole access chamber or pot apparatus 800 comprises a substantially cylindrical rigid enclosure with substantially vertical side walls 804 ending in an upper lip or flange adapted to fit into a suitably sized opening in the foundation or floor slab 110 of a building, such that the upper flange or lip catches and bears on the slab 100 around the circumference of the access chamber or pot 800, such as to transfer loads from the top of the chamber 800 or its lid 801 to the foundation or floor slab 110. In one embodiment, the borehole access chamber or pot 800 also comprises a borehole hub 803 located in a substantially flat bottom 805 of the chamber 800. The borehole hub 803 is preferably suitably sized to accurately locate a desired borehole drilling position under a floor or foundation slab 110 of a building, to anchor a drilling fluid recovery pump during and/or after drilling, and to contain an upper portion of a borehole grouting such as emplaced upon completion of installation of a geoexchange piping loop or monitoring well or the like within the completed borehole. The borehole chamber bottom 805 may preferably provide a load bearing capacity on ground or other material below the access chamber or pot 800 to distribute a portion of a load imposed on the top of the borehole access chamber pot 800 or lid 801 thereof.

In a particular embodiment, the borehole access chamber or pot 800 also comprises a substantially flat lid 801 which may preferably fit flush with the top of the upper flange of the sidewalls 804 of the chamber 800. The lid 801 is preferably securable with one or more bolts 802 which may provide for removal of the lid for access to the borehole during drilling, well or geoexchange pipe loop installation or maintenance or inspection by authorized personnel, but which preferably allow for tamper-resistant securing of the lid 801 following completion of the borehole access requirements. Further, borehole access chamber lid 801 and also the rest of the borehole access chamber or pot 800 may also preferably be made of a suitable material and be suitably reinforced to support loads sufficient to allow vehicle traffic (such as in the lower level of a parking garage of a building) or other anticipated loads (such as within occupied or equipment rooms of a building) to pass over and/or rest on the lid 801 without damage to the lid, borehole access chamber 800, or floor or foundation slab 110. In one embodiment, suitable such materials may comprise plastics, polymers including glass or other composite fiber-reinforced polymers, metal alloys, or combinations thereof.

In a further embodiment, borehole access chamber 800 may also comprise one or more ports or holes in the sidewalls 804 of the chamber 800, such as to allow for connection of borehole piping, controls or other components housed in the one borehole access chamber 800 with other borehole access chambers 800 installed in the foundation slab 110, or with other building equipment or systems. In one exemplary embodiment, foundation slab 110 may comprise multiple borehole access chambers 800 each of which provide access for drilling and installation of a geoexchange piping loop in a bore hole, and the multiple borehole geoexchange piping loops and optional associated control devices located at the top of one or more boreholes may be interconnected to each other and also to geoexchange system equipment in the building by connecting piping which may enter borehole access chambers 800 by one or more access holes or ports in the sidewalls 804 of the borehole access chamber 800. In another embodiment such as may be advantageous for applications where a geoexchange system is being installed in a new construction building, the connecting pipes and borehole access chambers 800 may be installed within or below the foundation slab 110, so as to provide connection for multiple borehole geoexchange piping loops with hidden connecting pipes built into or below the foundation slab 110 when it is poured or otherwise installed. In another embodiment such as may be advantageous for applications where a geoexchange system is being retrofitted in an existing building, borehole access chambers 800 may be retrofittably installed into the foundation slab 110, and connecting piping may be installed such as along walls, columns, building structures or ceilings of the existing building, so as to connect multiple borehole geoexchange piping loops located in borehole access chambers 800 to a building geoexchange system without requiring access to the underside or interior of the foundation slab 110 of the existing building. In one such embodiment for retrofit installation, borehole access chambers 800 may comprise additional access holes or ports in at least one of the lid 801, sidewalls 804 and base 805 of the chamber 800 to provide access for connection of borehole geoexchange piping loops to the retrofit building geoexchange system, for example.

According to another aspect of the present invention, a method of installing a geoexchange borehole in a limited headroom interior space of a building is provided. A first step of the method comprises installing a borehole access chamber or pot through and under the foundation or floor slab of the lowest level of the building. In one embodiment, the borehole access chamber may be installed at a desired geoexchange borehole location prior to installation of a foundation slab-on-grade of a new building during construction, and the foundation slab may be installed around the borehole access chamber. In another embodiment, the borehole access chamber may be retrofittably installed into an existing foundation or floor slab of a building at a desired geoexchange borehole location such as by cutting a suitable sized hole in the slab at the desired geoexchange borehole location and installing the access chamber through the hole. In a particular embodiment, the installation of a borehole access chamber at the exact desired location for a borehole in the foundation slab of a building may desirably allow for more precise location control of the borehole with respect to sub-slab conduits, services and other associated structures, so as to reduce the likelihood of damaging or destroying such structures during drilling of a borehole, as may be particularly important in the case of retrofit installation in an existing building, for example.

A second step of the method comprises positioning a low headroom floor mounted rotary drilling apparatus over the borehole access chamber at the desired borehole location. In a preferred embodiment, the low headroom floor mounted drilling apparatus may desirably be secured or anchored to the floor or foundation slab of the building, such as by bolting one or more floor support members of the drilling apparatus to the floor or foundation slab, as may be preferred to improve accuracy and control of borehole location within the borehole access chamber, as well as to desirably provide for reaction force against the floor or foundation slab for advancing the drilling apparatus during operation. In an optional embodiment, the drilling apparatus may further comprise a vertical ceiling jack, so as to additionally anchor or secure the drilling apparatus against the ceiling above the floor or foundation slab, and additionally to provide for further reaction force against the ceiling during drilling operation. In a further optional embodiment, the drilling apparatus may comprise an electrically or hydraulically powered rotary drill head motor for rotating a hollow drill rod string during drilling. In yet a further optional embodiment, the drilling apparatus may be positioned using a forklift or other standard materials handling equipment as may be desirable for improving access to low headroom areas of a building such as a lower level of a parking garage and for improving efficiency of deployment and repositioning of the drilling apparatus in applications where multiple boreholes are desired to be installed in a foundation or floor slab, and may require frequent repositioning of the drilling apparatus.

A third step of the present method comprises providing a pressurized drilling fluid to the drill rod string of the drilling apparatus with a drilling fluid supply system and powering a rotary downhole drilling device attached to the drill rod string to advance the borehole to a desired depth. In one embodiment, the downhole drilling device may comprise a downhole pressurized water hammer, a pressurized water powered drill bit, a drilling mud powered mud rotary drill bit or an air powered air rotary drill bit or downhole air hammer, for example. In another embodiment where the pressurized drilling fluid comprises pressurized water and optionally also one or more drilling fluid additives, the drilling fluid supply system may comprise a supply of recycled drilling water from a drilling fluid recycling apparatus, a water holding tank, and a high pressure drill pump for providing high pressure water to power a downhole water hammer drill bit. In a preferred embodiment, at least the high pressure drill pump may desirably be co-located nearby the drilling apparatus on the lower floor of the building and the high-pressure drill pump may desirably be electrically powered such as to reduce emissions in a confined building space, for example.

A fourth step of the present method comprises recovering drilling fluid and drill cuttings returned from the borehole during drilling and removing the drilling fluid and drill cuttings from at least one of the borehole, the borehole access chamber or a drilling fluid splash pan of the low headroom drilling apparatus installed over the borehole access chamber using a drilling fluid collection system and conveying the drilling fluid and drill cuttings to a drilling fluid recycling apparatus. In one embodiment, the drilling fluid collection system may comprise at least a drilling fluid collection tank, a sludge lift pump and a drilling fluid recycling apparatus. In a preferred embodiment, at least the drilling fluid collection tank and sludge lift pump may be co-located near the drilling apparatus on the lowest level or slab of the building, and the drilling fluid recycling apparatus may be located at a street level or other easily accessible location in or outside the building to desirably facilitate removal of drill cutting wastes from the site.

A fifth step of the present method comprises removing at least a substantial portion of the drill cuttings particles or solids from the recovered drilling fluid and drill cuttings using the drilling fluid recycling apparatus. In one embodiment, the drilling fluid recycling apparatus comprises at least primary and secondary drill cuttings particle removal means, a drill cuttings disposal container, and at least one drilling fluid holding tank. In a preferred embodiment, the primary drill cuttings particle removal means may comprise first and second shaker screen separators, and the secondary drill cuttings particle removal means may comprise first and second cyclonic particle separators and associated first and second cyclonic pressure pumps. In a further embodiment, the drilling fluid and drill cuttings conveyed to the recycling apparatus may pass sequentially through at least: a first coarse shaker screen, a first coarse cyclonic separator, a second fine shaker screen and a second fine cyclonic separator, before substantially cleaned recycled drilling fluid is supplied from the second cyclonic separator back to the drilling fluid supply system to be recycled and reused in the drilling apparatus. In yet a further embodiment, the recycling apparatus may comprise a drill cuttings holding hopper and a disposal container such as a standard roll-on roll-off dumpster disposal container to facilitate easy periodic transport of separated drill cuttings waste for disposal offsite. In an optional embodiment, following separation of the drill cuttings from the drilling fluid in the recycling apparatus, the drill cuttings may be disposed of in an enclosed chamber within a building, such as within an enclosed chamber beneath a parking garage ramp or other area preferably in the lower levels of the building to conveniently provide for onsite disposal of drill cuttings, for example.

A sixth step of the present method comprises returning a recycled drilling fluid substantially cleaned of the drill cuttings particles to the drilling apparatus using the drilling fluid supply system described above. In one embodiment, the drilling fluid supply system may comprise an optional final polishing filter to further remove fine particles of drill cuttings from the drilling fluid prior to providing the recycled drilling fluid back to the drilling apparatus for reuse. In such an embodiment, the optional polishing filter may comprise any suitable known type of fluid filter such as a bag filter, belt filter, flocculating filter, screen filter or depth filter which may be suited to filter the drilling fluid to a specification suitable for use in the drilling apparatus and any downhole drilling device, for example.

In an optional embodiment, the present method may comprise an additional optional step of automatically providing and handling threaded drill rod sections from an automated drill rod loading apparatus to the drill rod string of the low headroom drilling apparatus. In a preferred embodiment, the automated drill rod loading apparatus may comprise at least a drill rod caddy for storing threaded drill rod sections and an extendable or telescopic drill rod loader arm operable to automatically move a drill rod section from the caddy to the drilling apparatus for threaded attachment to the drill rod string, or to automatically move a drill rod section from the drill rod string of the drilling apparatus to the drill rod caddy for storage. Preferably, the automated drill rod loading apparatus may be connected to and controlled by the drilling apparatus in order to coordinate and synchronize the addition to or removal of a drill rod section from the drilling apparatus in sequence with the stroke of the drilling apparatus so as to provide for improved efficiency and speed of managing drill rod sections of the drill rod string and to allow automation of such drill rod manipulation as may be desirable for efficient operation with limited manual input in an interior building environment where multiple similar geoexchange boreholes are required to be installed.

In a further embodiment, the present method may also comprise the step of installing at least one return loop of geoexchange piping in the completed geoexchange borehole. According to one embodiment, any suitable known type of geoexchange piping may be installed in such step, as may desirably provide for circulation of at least one geoexchange working fluid through the piping extending down the borehole to effect a geoexchange thermal transfer with the ground mass surrounding the borehole, for example. In one embodiment, the present step may also include grouting, cementing or otherwise securing the geoexchange piping loop in the borehole following installation of the geoexchange piping. In a preferred embodiment, a tremi pipe may desirably be installed alongside the geoexchange piping loop in the borehole, and may preferably be installed coincidentally with the geoexchange piping loop, in order to allow grouting or cementing of the geoexchange piping loop in the borehole by injecting grout or cement into the tremi pipe to fill the borehole from the bottom up, thereby advantageously displacing any air or drilling fluid in the borehole. In an optional embodiment, geoexchange piping may optionally be installed off of rolls or spools of pipe, such as by using a geoexchange piping threader which may optionally comprise two or more controllably powered opposing wheels or pulleys which tractably guide the geoexchange piping from the roll or spool between the opposing wheels or pulleys, and feed the piping down the borehole, for example. In another alternative embodiment, the geoexchange piping loop may comprise a coaxial geoexchange pipe or heat exchanger or a metal direct geoexchange piping loop, for example. In yet a further alternative embodiment, two or more loops of geoexchange piping may be installed in a single borehole, and may be installed extending to one or more different depths in the borehole, for example.

In an optional aspect of the invention, any of the above-disclosed drilling system and method embodiments may be used for applications other than geoexchange piping installation which require drilling of boreholes below an existing building or below a foundation or floor slab of other structure. Without limitation, exemplary other such applications may include pumping or extraction well or monitoring well installation, maintenance, access, monitoring, exploration, or other types of borehole installation, for example.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the scope thereof. Accordingly, the scope of the invention is to be construed in accordance with the substance defined by the following claims.

What is claimed is:

1. A method of installing a geoexchange borehole in an interior space of a building, comprising:
    installing a borehole access chamber in a floor slab of said building at a desired borehole location;
    positioning a low headroom floor supported rotary drilling apparatus comprising a drill rod string over the borehole access chamber at the desired borehole location;
    providing a pressurized drilling fluid to said drill rod string of said drilling apparatus with a drilling fluid supply system and powering a rotary downhole drilling device attached to said drill rod string to advance said borehole to a desired depth;
    recovering a drilling fluid and drill cuttings returned from said borehole during drilling and removing said drilling fluid and drill cuttings from at least one of:
        said borehole;
        said borehole access chamber and;
        a drilling fluid splash pan installed over said borehole access chamber;
        and conveying said drilling fluid and drill cuttings to a drilling fluid recycling
        apparatus using a drilling fluid recovery system;
    removing at least a substantial portion of said drill cuttings from said recovered drilling fluid and drill cuttings using said drilling fluid recycling apparatus; and
    returning a recycled drilling fluid substantially cleaned of said drill cuttings to said drilling apparatus using said drilling fluid supply system;
    wherein said drilling fluid collection system comprises at least one drilling fluid collection tank, and at least one sludge lift pump fluidly connected to said drilling fluid recycling system.

2. The method of installing a geoexchange borehole in an interior space of a building according to claim 1, additionally comprising:
    automatically providing and handling threaded drill rod sections from an automated drill rod loading apparatus to said drill rod string of said drilling apparatus.

3. The method of installing a geoexchange borehole in an interior space of a building according to claim 1, additionally comprising:
    installing at least one return loop of geoexchange piping in said geoexchange borehole.

4. The method of installing a geoexchange borehole in an interior space of a building according to claim 3, additionally comprising:
    grouting said loop of geoexchange piping in said geoexchange borehole.

5. The method of installing a geoexchange borehole in an interior space of a building according to claim 1, wherein positioning said rotary drilling apparatus additionally comprises securing said rotary drilling apparatus to said floor slab.

6. The method of installing a geoexchange borehole in an interior space of a building according to claim 1, wherein said drilling fluid comprises water and said rotary downhole drilling device comprises a pressurized water downhole hammer drill.

7. The method of installing a geoexchange borehole in an interior space of a building according to claim 6, wherein said drilling fluid supply system comprises a polishing filter, at least one holding tank, and a high pressure drill water supply pump.

8. The method of installing a geoexchange borehole in an interior space of a building according to claim 1, wherein said drilling fluid recycling apparatus comprises at least one primary shaking screen particle separator and at least one primary cyclonic particle separator.

9. The method of installing a geoexchange borehole in an interior space of a building according to claim 8, wherein said drilling fluid recycling apparatus further comprises at least one drill cuttings holding hopper and at least one drill cuttings disposal container.

10. A low headroom confined space drilling apparatus comprising:
- a floor supported base frame;
- a drill mast rotatingly mounted to said base frame for elevation to a substantially vertical drilling position;
- a rotary drill head motor axially extendably mounted to said drill mast for rotating a drill rod string;
- an automated drill rod loading apparatus attached to said base frame and comprising:
  - a drill rod caddy containing at least one threaded drill rod section; and
  - at least one extendable pivoting arm operable to automatically retrieve
  - and handle a threaded drill rod section for attachment to said drill rod string;
- a pressurized water powered water hammer drill attached a lower end of said drill rod string; and
- a high pressure water pump fluidly attached to said water hammer drill through said drill rod string.

11. The low headroom confined space drilling apparatus according to claim 10, additionally comprising a vertical ceiling jack mounted to a top end of said drill mast for forceably engaging a ceiling surface above said floor slab.

12. A low headroom confined space drilling system comprising:
- a low headroom confined space drilling apparatus comprising a floor supported base frame, a pressurized water powered downhole water hammer drill and an automated drill rod loading apparatus attached to said base frame;
- a drilling fluid supply system comprising at least one water holding tank and a high pressure water pump for supplying pressurized water to said downhole water hammer drill;
- a drilling fluid collection system comprising at least one drilling fluid collection tank, and at least one sludge lift pump; and
- a drilling fluid recycling apparatus comprising at least one shaking screen particle separator, at least one cyclonic particle separator, at least one drill cuttings holding hopper and at least one drill cutting disposal container, for providing a recycled drilling fluid stream to said drilling fluid supply system.

13. The low headroom confined space drilling system according to claim 12, wherein said drilling apparatus additionally comprises an automatic control system for controlling at least the operation of said downhole pressurized water hammer drill and said automated drill rod loading apparatus.

14. A method of installing a geoexchange borehole in an interior space of a building, comprising:
- installing a borehole access chamber in a floor slab of said building at a desired borehole location;
- positioning a low headroom floor supported rotary drilling apparatus comprising a drill rod string over the borehole access chamber at the desired borehole location;
- providing a pressurized drilling fluid to said drill rod string of said drilling apparatus with a drilling fluid supply system and powering a rotary downhole drilling device attached to said drill rod string to advance said borehole to a desired depth;
- recovering a drilling fluid and drill cuttings returned from said borehole during drilling and removing said drilling fluid and drill cuttings from at least one of:
  - said borehole; and
  - said borehole access chamber; and
  - conveying said drilling fluid and drill cuttings to a drilling fluid recycling
  - apparatus using a drilling fluid recovery system;
- removing at least a substantial portion of said drill cuttings from said recovered drilling fluid and drill cuttings using said drilling fluid recycling apparatus; and
- returning a recycled drilling fluid substantially cleaned of said drill cuttings to said drilling apparatus using said drilling fluid supply system;

wherein said drilling fluid recycling apparatus comprises at least one of: a primary shaking screen particle separator; and a primary cyclonic particle separator.

15. The method of installing the geoexchange borehole in the interior space of the building according to claim 14, additionally comprising installing at least one return loop of geoexchange piping in said geoexchange borehole.

* * * * *